(12) United States Patent
Slota et al.

(10) Patent No.: US 10,671,106 B2
(45) Date of Patent: *Jun. 2, 2020

(54) SYSTEM AND METHOD FOR SYNCHRONIZING MULTIPLE GENERATORS WITH AN ELECTRICAL POWER DISTRIBUTION SYSTEM

(71) Applicant: Electro Industries/Gauge Tech, Westbury, NY (US)

(72) Inventors: Frederick B. Slota, Aberdeen, SD (US); Erran Kagan, Great Neck, NY (US)

(73) Assignee: ELECTRO INDUSTRIES/ GAUGETECH, Westbury, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,661

(22) Filed: Sep. 11, 2015

(65) Prior Publication Data

US 2015/0378380 A1 Dec. 31, 2015

Related U.S. Application Data

(63) Continuation of application No. 13/439,333, filed on Apr. 4, 2012, now Pat. No. 9,136,711, which is a
(Continued)

(51) Int. Cl.
*H02J 3/08* (2006.01)
*H02J 3/38* (2006.01)
(Continued)

(52) U.S. Cl.
CPC ............ *G05F 1/625* (2013.01); *G05B 15/02* (2013.01); *G05F 1/66* (2013.01); *H02J 3/08* (2013.01);
(Continued)

(58) Field of Classification Search
CPC ..... G05B 23/02; H02J 3/06; H02J 3/08; H02J 3/34; H02J 3/38; H02J 3/40; H02J 3/42; H02J 13/0051; H05B 37/0272
(Continued)

(56) References Cited

U.S. PATENT DOCUMENTS 3,491,248 A   1/1970   Beckwith et al.
4,218,625 A   8/1980   Beckwith et al.
(Continued)

OTHER PUBLICATIONS

ABB AG Power Technology Systems, Plant Electrical Systems, 2005, ABB pp. 1-6.
(Continued)

*Primary Examiner* — Jennifer L Norton
(74) *Attorney, Agent, or Firm* — Gerald Hespos; Michael Porco; Matthew T. Hespos

(57) ABSTRACT

Systems and method for synchronizing power generators with a power grid are provided. One system among various implementations includes a plurality of synchronization modules, wherein each synchronization module corresponds to one power generator. The synchronization modules are configured to output a control signal to adjust a frequency of the respective power generator to correspond with the frequency of the existing power grid. The system also includes a central controller in communication with the plurality of synchronization modules. The central controller is configured to determine a propagation delay with respect to each synchronization module. The propagation delay is a measure of time for a signal to propagate from the respective synchronization module to the central controller. The central controller is further configured to send a control signal to each synchronization module to control when each synchronization module connects the respective power generator to the existing power grid.

28 Claims, 8 Drawing Sheets

Related U.S. Application Data continuation-in-part of application No. 13/013,171, filed on Jan. 25, 2011, now Pat. No. 8,407,016, which is a continuation of application No. 11/894,553, filed on Aug. 21, 2007, now Pat. No. 7,877,169.

(51) Int. Cl.

| | | |
|---|---|---|
| *H02J 3/40* | (2006.01) | |
| *H02J 3/42* | (2006.01) | |
| *G05B 15/02* | (2006.01) | |
| *G05B 23/02* | (2006.01) | |
| *G05F 1/66* | (2006.01) | |
| *H05B 47/19* | (2020.01) | |
| *H02J 3/34* | (2006.01) | |
| *G05F 1/625* | (2006.01) | |
| *H02J 3/06* | (2006.01) | |
| *H02J 13/00* | (2006.01) | |
| *H05B 37/02* | (2006.01) | |

(52) U.S. Cl.
CPC ............... *H02J 3/34* (2013.01); *H02J 3/38* (2013.01); *H02J 3/40* (2013.01); *H02J 3/42* (2013.01); *G05B 23/02* (2013.01); *H02J 3/06* (2013.01); *H02J 13/00009* (2020.01); *H05B 47/19* (2020.01); *Y10T 307/735* (2015.04)

(58) Field of Classification Search
USPC ............ 700/286, 287, 297; 307/87; 322/29; 323/212, 235, 244
See application file for complete search history.

(56) References Cited

U.S. PATENT DOCUMENTS

| | | | |
|---|---|---|---|
| 4,256,972 A | 3/1981 | Wyatt et al. | |
| 4,310,771 A | 1/1982 | Wyatt et al. | |
| 4,380,146 A | 4/1983 | Yannone et al. | |
| 4,804,938 A * | 2/1989 | Rouse .................... | H02J 3/14 307/11 |
| 6,327,541 B1 | 12/2001 | Pitchford et al. | |
| 6,483,825 B2 | 11/2002 | Seta | |
| 6,496,342 B1 | 12/2002 | Horvath et al. | |
| 6,650,249 B2 | 11/2003 | Meyer et al. | |
| 6,654,216 B2 | 11/2003 | Horvath et al. | |
| 6,751,562 B1 | 6/2004 | Blackett et al. | |
| 6,798,190 B2 | 9/2004 | Harding et al. | |
| 6,847,297 B2 | 1/2005 | Lavoie et al. | |
| 6,892,115 B2 | 5/2005 | Berkcan et al. | |
| 7,406,354 B2 * | 7/2008 | Pearce ................... | H04J 3/0682 370/452 |
| 7,453,674 B2 * | 11/2008 | Kuehnle ................. | H02J 3/38 361/20 |
| 7,698,582 B2 | 4/2010 | Qin et al. | |
| 7,877,169 B2 | 1/2011 | Slota et al. | |
| 7,923,853 B2 | 4/2011 | Lewis | |
| 8,407,016 B2 | 3/2013 | Slota et al. | |
| 8,761,948 B1 * | 6/2014 | Ippolito .................. | G05F 1/67 174/364 |
| 9,136,711 B2 * | 9/2015 | Slota ...................... | H02J 3/42 |
| 9,720,395 B2 * | 8/2017 | Shi ........................ | G05B 19/042 |
| 9,989,034 B2 * | 6/2018 | Andresen ............... | F03D 7/042 |
| 10,237,008 B2 * | 3/2019 | Butterworth .......... | H04J 3/0661 |
| 2004/0025496 A1 * | 2/2004 | Patterson, Jr. .......... | F41H 11/00 60/254 |
| 2004/0123174 A1 * | 6/2004 | Dhupar ................. | H04J 3/0638 713/401 |
| 2004/0264478 A1 * | 12/2004 | Van Der Valk ....... | H04J 3/0664 370/395.62 |
| 2006/0235574 A1 | 10/2006 | Lapinski et al. | |
| 2007/0010898 A1 * | 1/2007 | Hosek ................. | G05B 19/4148 700/2 |
| 2008/0279321 A1 | 11/2008 | Bickel et al. | |
| 2009/0096211 A1 * | 4/2009 | Stiesdal ................ | H02J 3/1835 290/44 |
| 2010/0134089 A1 * | 6/2010 | Uram .................... | G01R 22/063 324/66 |
| 2011/0118855 A1 | 5/2011 | Hosek et al. | |
| 2013/0073100 A1 | 3/2013 | Seeley | |
| 2015/0311903 A1 * | 10/2015 | Frampton ............... | H04B 3/542 700/287 |
| 2016/0285286 A1 * | 9/2016 | Kudo ..................... | H02J 3/32 |
| 2016/0347179 A1 * | 12/2016 | Bachmaier ............ | H02M 7/537 |
| 2018/0062394 A1 * | 3/2018 | Veda ....................... | H02J 3/04 |
| 2019/0027939 A1 * | 1/2019 | Kleen ..................... | F01D 15/10 |

OTHER PUBLICATIONS

BiTronics PowerPlex—Digital Power Transducer; Copyright Aveva 2005; Doc # AUTOMATION-L3-PPLEX-BR-10.05-1208-GB; 8 pages.

Bitronics, Inc.; "Applications in the Field . . . Auto-synchronizing", available at www.bitronics.com on Aug. 1, 2007; 2 pages.

Bitronics, Inc.; "Applications in the Field . . . Sync-check Application", available at www.bitronics.com on Aug. 1, 2007; 1 page.

Beckwith Electric Co. Inc.; "application Guide M-0193B Syncrocloser Unit"; Copyright 1999 Bethwith Electric Co.; Document # 800-0193B-AG-MC2; 25 pages.

\* cited by examiner

SYSTEM AND METHOD FOR SYNCHRONIZING MULTIPLE GENERATORS WITH AN ELECTRICAL POWER DISTRIBUTION SYSTEM

PRIORITY

The present application is a continuation application of U.S. application Ser. No. 13/439,333, filed Apr. 4, 2012, now U.S. Pat. No. 9,136,711, which is a continuation-in-part application of U.S. application Ser. No. 13/013,171, filed Jan. 25, 2011, now U.S. Pat. No. 8,407,016, which is a continuation application of U.S. application Ser. No. 11/894,553, filed Aug. 21, 2007, now U.S. Pat. No. 7,877,169, the contents of which are hereby incorporated by reference in their entirety.

BACKGROUND OF THE INVENTION

1. Field

The present disclosure relates generally to power generation devices. More particularly, the present disclosure relates to a system and method for synchronizing power generation devices to ac electrical power systems.

2. Description of the Related Art

Generally speaking, a power plant uses generators rotated by steam, water, or an engine to produce electrical energy in the form of three-phase alternating current of a fixed voltage and a fixed frequency. Electricity so produced is then delivered to consumers through a network of transformers and transmission lines often referred to as a power distribution grid (i.e., the grid). Within the grid of a single utility company, power generation will often be distributed among several power plants to reduce distribution costs and to improve the reliability of the system. With multiple generators operating, a customer need not lose electrical power simply because a single generator has been taken off-line.

As is well known in the art, a generator is a dynamoelectric machine employing the principles of generator action to produce the electrical output. A generator is a mechanically massive structure and electrically complex, with typical output power ratings up to 1,500 MVA at voltages up to 26 kilovolts (kV). A generator can only be connected to a common electrical bus, or grid, if turning in synchronization with other generators already on the grid. Synchronization requires that the generators are producing alternating current at the same frequency, and that the outputs of the generators are in phase with one another. If both conditions are not met, extremely large electrical currents will flow through the generators, potentially tripping circuit breakers within the network, or even damaging equipment. If a national grid is in place, ideally every generator on the grid, across the entire country, should be turning in synchronization. Presently, to synchronize a generator to a power grid network, expensive dedicated measuring/control equipment is required.

Typically, the synchronization equipment is part of a distributed system including discrete components coupled to the power grid and the generator. This necessitates the use of a high speed communication system for communicating control signals associated with coupling the auxiliary generator to the power grid network once it has been determined that the auxiliary generator has been synchronized. However, such high speed communication systems are prone to many potential failures.

Thus, a need exists for techniques for synchronizing an auxiliary generator to an electrical system, such as an electrical distribution system, e.g., a utility grid in a cost effective manner, without the need for dedicated measuring/control equipment.

SUMMARY OF THE INVENTION

The present disclosure provides a method and apparatus to control the interconnection of an auxiliary AC generator with an electrical system, such as an electrical distribution system, e.g., a utility grid. Broadly, a measuring circuit measures the frequency of an auxiliary AC generator and the phase angle between one voltage phase of the generator and the correspondent voltage phase of the electric utility's electricity supply lines, i.e., the grid, each of which are averaged and filtered. The measured frequency of the auxiliary AC generator is matched to the frequency of the electrical system and the measured phase angle of the generator is matched to the electric utility's electricity supply lines. Once matching is achieved to within a defined tolerance, interconnecting contactors are closed.

According to one aspect, the step of closing the interconnecting contactors may be manual or automatic.

According to one aspect, the present disclosure provides a method for controlling the interconnection of an auxiliary AC generator with an electrical system, such as an electrical distribution system, e.g., a utility grid, the method comprising: determining the frequency of the auxiliary AC generator; computing the phase angle difference between a voltage phase of the auxiliary generator and a corresponding voltage phase of the multi-phase electrical distribution system; adjusting the frequency of the auxiliary generator until it is determined to be substantially equal to the frequency of the electrical distribution system and the phase angle is determined to be within a defined tolerance; and closing a set of interconnecting contactors to connect the auxiliary AC generator to the electrical system.

In accordance with the method, synchronization may be maintained on a continuous basis as opposed to just during startup.

According to one aspect of the present disclosure, the apparatus to control the interconnection of an auxiliary AC generator with an electrical system is incorporated into a power meter.

The above and other aspects, features, and advantages of the present disclosure will become more apparent in light of the following detailed description when taken in conjunction with the accompanying drawings.

BRIEF DESCRIPTION OF THE DRAWINGS

FIG. 3b is a block diagram of an apparatus for controlling the interconnection of an auxiliary generator to an electrical system which includes the IED of FIG. 3a;

DETAILED DESCRIPTION OF THE PREFERRED EMBODIMENTS

Figure 1:
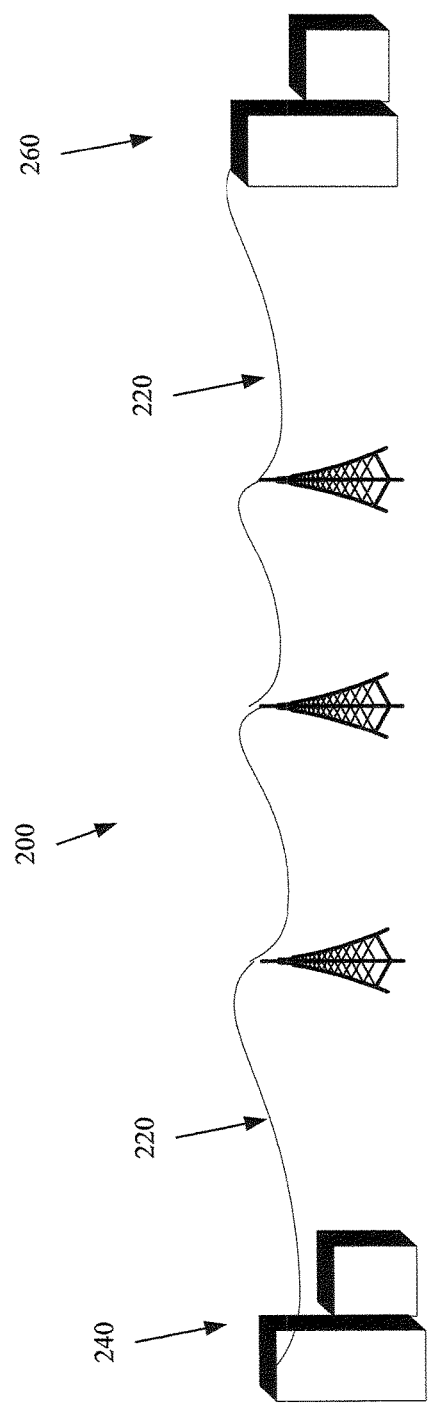
FIG. 1 is a diagram depicting the general environment in which the inventive system and method are used, according to an embodiment of the present disclosure.

Preferred embodiments of the present disclosure will be described herein below with reference to the accompanying drawings. In the following description, well-known functions or constructions are not described in detail to avoid obscuring the present disclosure in unnecessary detail. As used herein, intelligent electronic devices ("IED's") include Programmable Logic Controllers ("PLC's"), Remote Terminal Units ("RTU's"), electric power meters, protective relays, fault recorders and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. Exemplary intelligent electronic devices are disclosed and described in the following commonly owned U.S. issued patents and published applications: U.S. patent application Ser. No. 10/146,339 entitled "METER WITH IRDA PORT" filed on May 15, 2002; U.S. patent application Ser. No. 10/958,456 entitled "METER HAVING A COMMUNICATION INTERFACE FOR RECEIVING AND INTERFACING WITH A COMMUNICATION DEVICE" filed on Oct. 5, 2004; U.S. patent application Ser. No. 11/087,438 entitled "SYSTEM AND METHOD FOR SIMULTANEOUS COMMUNICATION ON MODBUS AND DNP 3.0 OVER ETHERNET FOR ELECTRONIC POWER METER" filed on Mar. 23, 2005; U.S. patent application Ser. No. 11/109,351 entitled 'SYSTEM AND METHOD FOR COMPENSATING FOR POTENTIAL AND CURRENT TRANSFORMERS IN ENERGY METERS" filed on Apr. 18, 2005; U.S. patent application Ser. No. 11/039,316 entitled "MULTIPLE ETHERNET PORTS ON POWER METER" filed on Jan. 19, 2005; U.S. patent application Ser. No. 11/003,064 entitled "CURRENT INPUTS INTERFACE FOR AN ELECTRICAL DEVICE" filed on Dec. 3, 2004; U.S. patent application Ser. No. 11/042,588 entitled "SYSTEM AND METHOD FOR CONNECTING ELECTRICAL DEVICES USING FIBER OPTIC SERIAL COMMUNICATION" filed on Jan. 24, 2005; U.S. Design Pat. No. D525,893 entitled "ELECTRONIC POWER METER" issued on Aug. 1, 2006; U.S. patent application Ser. No. 11/091,254 entitled "SYSTEM AND METHOD FOR PROVIDING UNIVERSAL ADDITIONAL FUNCTIONALITY FOR POWER METERS" filed on Mar. 28, 2005; U.S. patent application Ser. No. 11/341,802 entitled "METERING DEVICE WITH CONTROL FUNCTIONALITY AND METHOD THEREOF" filed on Jan. 27, 2006; U.S. Design patent application No. 29/224,737 entitled "WALL MOUNT ASSEMBLY" filed on Mar. 7, 2005; U.S. Design Pat. No. D526,920 entitled "ELECTRONIC METER" issued on Aug. 22, 2006; Continuation-in-Part U.S. patent application Ser. No. 11/317,227 entitled "TEST PULSES FOR ENABLING REVENUE TESTABLE PANEL METERS" filed on Dec. 22, 2005; U.S. Pat. No. 6,735,535 entitled "POWER METER HAVING AN AUTO-CALIBRATION FEATURE AND DATA ACQUISITION CAPABILITIES" issued on May 11, 2004; U.S. Pat. No. 6,636,030 entitled "REVENUE GRADE METER WITH HIGH-SPEED TRANSIENT DETECTION" issued on Oct. 21, 2002; U.S. Pat. No. 6,751,563 entitled "ELECTRONIC POWER METER" issued on Jun. 15, 2004; U.S. patent application Ser. No. 10/896,489 entitled "SYSTEM AND METHOD UTILIZING VIRTUAL SWITCHING FOR ELECTRIC PANEL METERING" filed on Jul. 22, 2004; U.S. patent application Ser. No. 10/896,521 entitled "ELECTRICAL METER INSTALLATION SYSTEM AND METHOD" filed on Jul. 22, 2004; U.S. patent application Ser. No. 10/969,713 entitled "TEST PULSES FOR ENABLING REVENUE TESTABLE PANEL METERS" filed on Oct. 20, 2004; U.S. patent application Ser. No. 10/969,592 entitled "SYSTEM AND METHOD FOR PROVIDING COMMUNICATION BETWEEN INTELLIGENT ELECTRONIC DEVICES VIA AN OPEN CHANNEL" filed on Oct. 20, 2004; and U.S. patent application Ser. No. 10/969,706 entitled "ON-LINE WEB ACCESSED ENERGY METER" filed on Oct. 20, 2004, the contents of all of which are hereby incorporated by reference in their entireties.

It is to be understood that the present disclosure may be implemented in various forms of hardware, software, firmware, special purpose processors, or a combination thereof. The IED also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Referring now to the drawings, wherein like reference numerals indicate the same parts throughout the several views, the inventive system is shown in its general environment in FIG. 1. Typically, a grid 200 is formed by a network of transmission lines 220. The grid 200 is used to transmit electrical power from generating facilities, i.e. power plants 240 and 260, to customers or end users. For a number of reasons, a grid, whether local, regional, or national, usually includes connections to multiple power plants. As discussed hereinabove, all power plants connected to grid 200 are ideally operating in synchronization and each power plant must be synchronized to grid 200 before being placed on-line. Synchronization requires a generator to produces electricity at precisely the same frequency as the power present on grid 200 and precisely in phase with grid 200.

Figure 2:
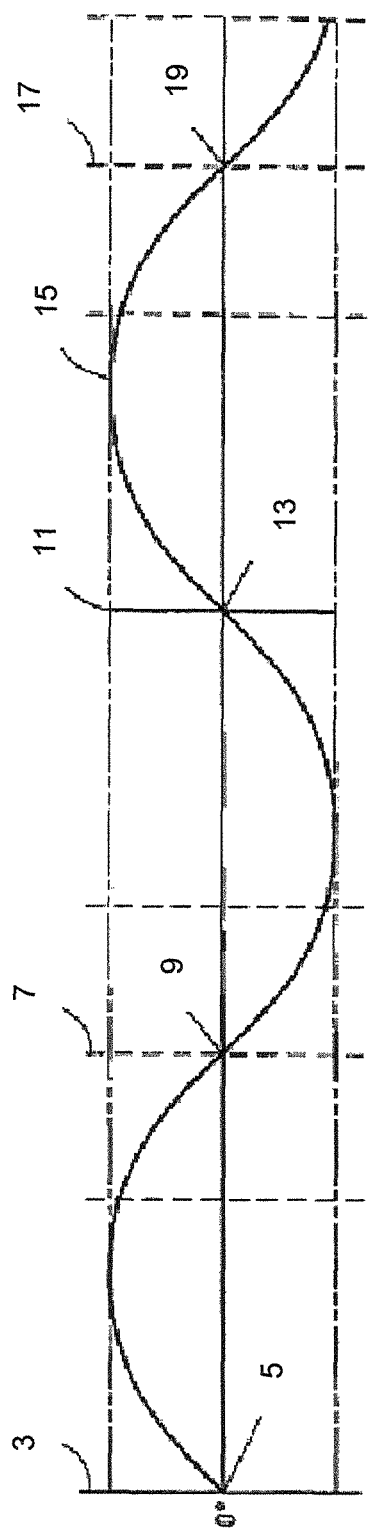
FIG. 2 is a diagram depicting the waveform of a single phase of electrical power as typically produced by a power plant, according to an embodiment of the present disclosure.

Referring next to FIG. 2, typically the electrical power present on a grid, such as grid 20, is in the form of a sine wave 15 of a fixed frequency, for example, 60 Hz in the United States. As will be apparent to those skilled in the art, sine wave 15 undergoes a zero crossing at zero degrees as shown at points 5 and 13 occurring at times 3 and 11, respectively, and at 180 degrees as shown at points 9 and 19 occurring at times 7 and 17, respectively. To be synchronized with the voltage represented by sine wave 15, a generator must produce electrical voltage which also has positive-going zero crossings at times 3 and 11 and negative-going zero crossings at times 7 and 17. It should be understood that the present disclosure is directed to synchronizing the voltage of an auxiliary generator with one of the three phases of the three-phase power produced by power plants. Thus, the sine wave 15 of FIG. 2 could represent any one of the three phases, i.e., phase-A, phase-B, phase C, produced by a power plant. Each phase being delayed by the other by 120 degrees.

Figure 3A:
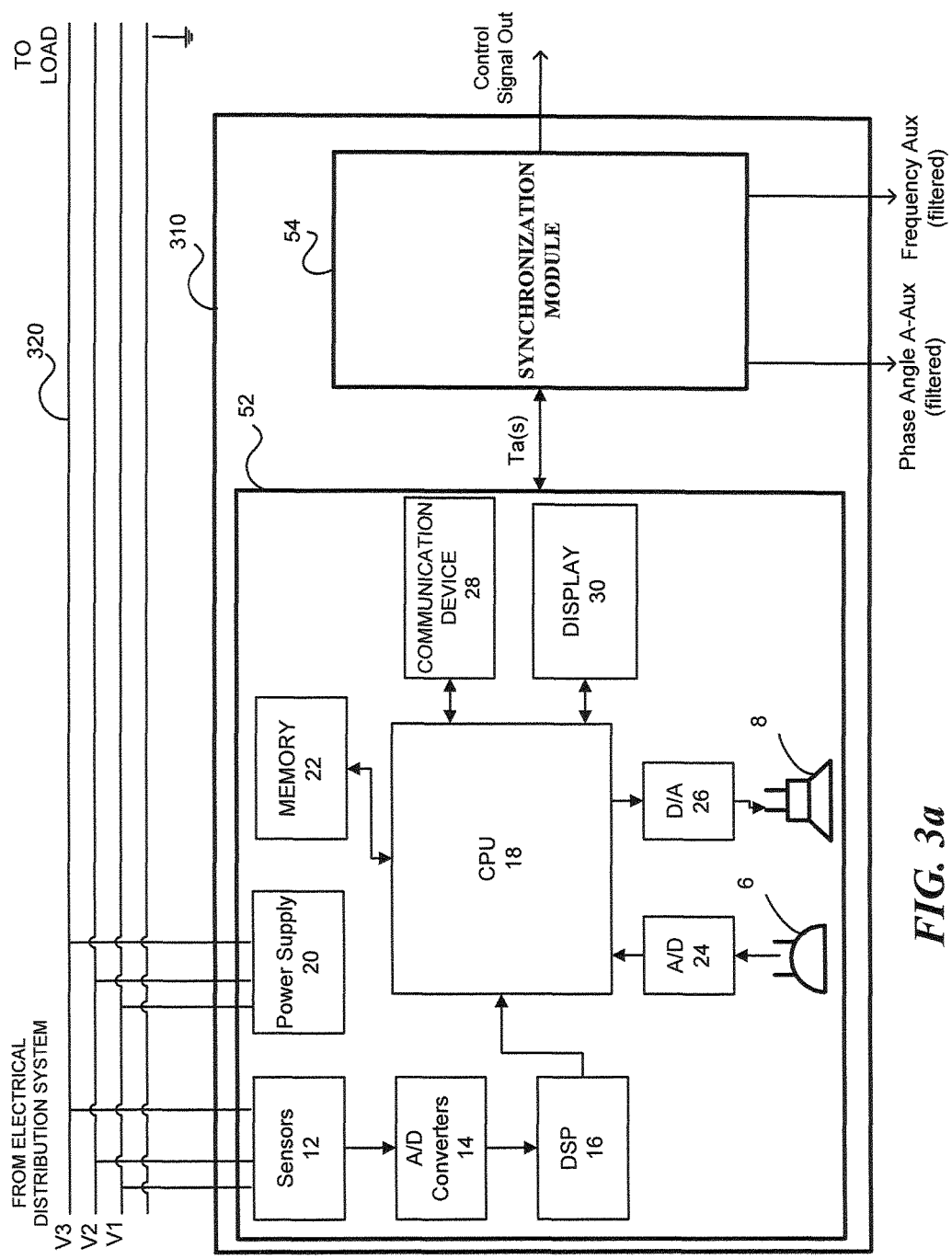
FIG. 3a is an intelligent electronic device (IED) for monitoring and determining an amount of electrical power usage by a consumer.
Figure 3B:
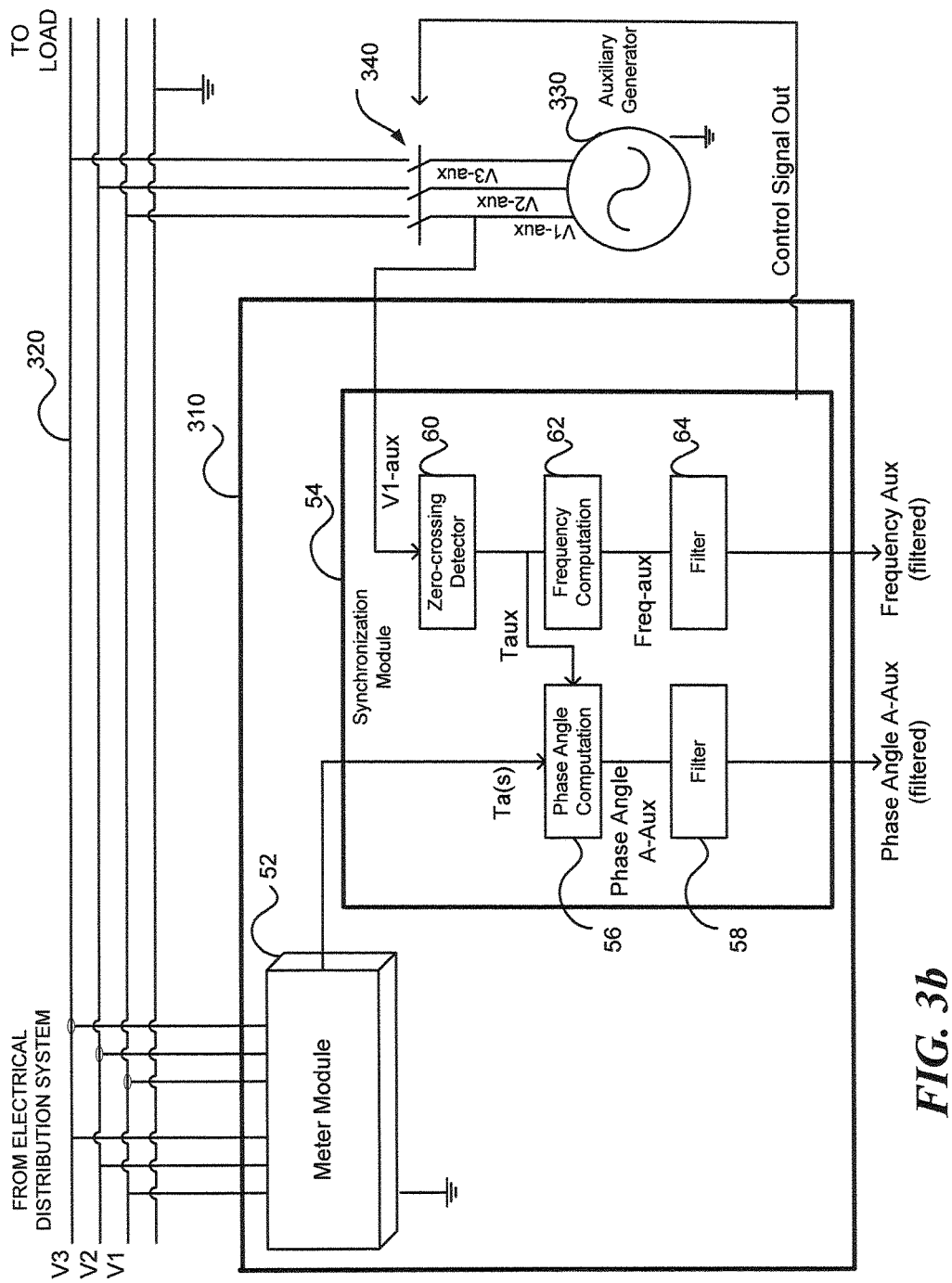

Referring now to FIG. 3*a*, an apparatus 310 for controlling the interconnection of an auxiliary generator 330 is illustrated. The apparatus includes a meter module 52 coupled to the electrical system 320 for measuring voltages, V1, V2 and V3 associated with the respective three-phase power produced by the power plant 240. The apparatus further includes a synchronization module 54 for controlling the interconnection of an auxiliary generator to the electrical system 320, as will be described below. It should be understood that elements of the synchronization module 54 are not shown in FIG. 3*a* for clarity. Instead, the elements of the synchronization module 54 are shown in FIG. 3*b*, and are described further below. The synchronization module 54 is shown coupled to the meter module 52 for receiving a zero-crossing time signal associated with one of the three-phase voltages (V1, or V2, or V3) from the electrical distribution system.

Meter Module 52

The meter module 52 monitors and determines an amount of electrical power usage by a consumer as illustrated in FIG. 1. Generally, the meter module 52 includes sensors 12, a plurality of analog-to-digital (ND) converters 14 and a processing system including a central processing unit (CPU) 18 and/or a digital signal processor (DSP) 16. The sensors 12 will sense electrical parameters, e.g., voltage and current, of the incoming lines from an electrical power distribution system. Preferably, the sensors will include current transformers and potential transformers, wherein one current transformer and one voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 14 configured to convert the analog output voltage from the transformer to a digital signal that can be processed by the CPU 18 or DSP 16.

The CPU 18 is configured for receiving the digital signals from the A/D converters 14 to perform the necessary calculations to determine the power usage and controlling the overall operations of the IED 310. In another embodiment, the DSP 16 will receive the digital signals from the A/D converters 14 and perform the necessary calculations to determine the power usage to free the resources of the CPU 18. It is to be appreciated that in certain embodiments the CPU 18 may perform all the functions performed by the CPU 18 and DSP 16, and therefore, in these embodiments the DSP 16 will not be utilized.

A power supply 20 is also provided for providing power to each component of the IED 310. Preferably, the power supply 20 is a transformer with its primary windings coupled to the incoming power distribution lines and having an appropriate number of windings to provide a nominal voltage, e.g., 5 VDC, at its secondary windings. In other embodiments, power is supplied from an independent source to the power supply 20, e.g., from a different electrical circuit, a uninterruptible power supply (UPS), etc. In another embodiment, the power supply 20 can also be a switch mode power supply in which the primary AC signal will be converted to a form of DC signal and then switched at high frequency such as but not limited to 100 Khz and then brought through a transformer which will step the primary voltage down to, for example, 5 Volts AC. A rectifier and a regulating circuit would then be used to regulate the voltage and provide a stable DC low voltage output.

The meter module 52 further includes a multimedia user interface for interacting with a user and for communicating events, alarms and instructions to the user. The user interface will include a display 30 for providing visual indications to the user. The display 30 may include a touch screen, a liquid crystal display (LCD), a plurality of LED number segments, individual light bulbs or any combination of these. The display 30 may provide the information to the user in the form of alpha-numeric lines, computer-generated graphics, videos, animations, etc. The user interface will also include a speaker or audible output means 8 for audibly producing instructions, alarms, data, etc. The speaker 8 will be coupled to the CPU 18 via a digital-to-analog converter (D/A) 26 for converting digital audio files stored in a memory 19 to analog signals playable by the speaker 8. An exemplary interface is disclosed and described in commonly owned co-pending U.S. application Ser. No. 11/589,381, entitled "POWER METER HAVING AUDIBLE AND VISUAL INTERFACE", which claims priority to U.S. Provisional Patent Appl. No. 60/731,006, filed Oct. 28, 2005, the contents of which are hereby incorporated by reference in their entireties.

The meter module 52 will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

In addition to storing audio and/or video files, memory 22 will store the sensed and generated data for further processing and for retrieval when call upon to be displayed at the meter module 52 or from a remote location. The memory 22 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, an IED can be easily upgraded as needed.

In a further embodiment, the meter module 52 will include a communication device 28 for enabling communications between the meter module and other computing devices, e.g., a desktop computer, laptop computer, other meter modules, etc. The communication device 28 may be a modem, network interface card (NIC), wireless transceiver, etc. The communication device 28 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed for wirelessly transmitting data.

The meter module 52 may communicate to a server or other computing device via a communication network. The meter module 52 and server may be connected to the communications network, e.g., the Internet, by any known means, for example, a hardwired or wireless connection, such as dial-up, hardwired, cable, DSL, satellite, cellular, PCS, wireless transmission (e.g., 802.11a/b/g), etc. It is to be appreciated that the network may be a local area network (LAN), wide area network (WAN), the Internet or any known network that couples a plurality of computers to enable various modes of communication via network messages. Furthermore, the server will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IP-Sec), Point-to-Point Tunneling Protocol (PPTP), Secure Sockets Layer (SSL) Protocol, etc. The server will further include a storage medium for storing a database of instructional videos, operating manuals, etc., the details of which will be described in detail below.

In an additional embodiment, the meter module 52 will also have the capability of not only digitizing the waveform, but storing the waveform and transferring that data upstream to a central computer, e.g., a remote server, when an event occurs such as a voltage surge or sag or a current short circuit. This data will be triggered on an event, stored to memory, e.g., non-volatile RAM, and additionally transferred to a host computer within the existing communication infrastructure. The digitized waveform will also allow the CPU 18 to compensate other electrical parameters such as harmonics, magnitudes, symmetrical components and phasor analysis. Using the harmonics, the IED 10 will also calculate dangerous heating conditions and can provide harmonic transformer derating based on harmonics found in the current waveform.

In a further embodiment, the meter module 52 will execute an e-mail client and will send e-mails to the utility or to the customer direct on an occasion that a power quality event occurs. This allows utility companies to dispatch crews to repair the condition. The data generated by the meters are use to diagnose the cause of the condition. The data is transferred through the infrastructure created by the electrical power distribution system.

Synchronization Module 54

Referring now to FIG. 3b, there is shown a detailed block diagram of the synchronization module 54 of FIG. 3a. The synchronization module 54 includes a phase-angle computation module 56 for receiving a zero crossing time of a selected voltage phase and a zero crossing time of the auxiliary voltage having a corresponding voltage phase and computes a phase-angle difference as output, a first filter module 58 for filtering the phase-angle difference output from the phase angle computation module 56, a zero-crossing detector 60 for detecting and outputting the zero crossing time of the auxiliary voltage, a frequency computation module 62 for computing a frequency of the auxiliary voltage and a second filter module 64 for filtering the computed frequency output from the frequency computation module 62. The synchronization module 54 is configured to control the interconnection of an auxiliary generator 330 to the electrical distribution system 320.

This process is generally described as follows. A more detailed description is provided further below with reference to FIG. 4.

Process Overview

Briefly, an overview of a process for controlling the interconnection of an auxiliary generator 330 to the electrical distribution system 320. is described as follows.

The meter module 52 outputs the zero crossing time, Ta(s) of a voltage, e.g., V1, associated with one phase, e.g., phase-A of the three-phase power. It is understood that any phase may be selected with the only requirement being that the same phase is selected on the auxiliary generator 330. The zero crossing time, Ta(s), of the selected voltage phase is supplied as one input to the phase-angle computation module 56 of synchronization module 54.

The phase angle computation module 56 also receives, as a second input, the zero crossing time T-aux of the voltage V1-aux associated with the corresponding voltage phase, e.g., phase-A, of the auxiliary generator 330, as a second input. This second input, T-aux, is output by the zero-crossing detector 60 of synchronization module 54, which receives V1-aux at its input. V1-aux represents the voltage of phase-A of the auxiliary generator 330. The phase-angle computation module 56 computes a phase angle difference, which is filtered by filtering module 58. The filtering module 58 outputs a filtered phase angle difference value, i.e., Phase-Angle$_{A\text{-}aux}$.

In a substantially parallel process, the frequency of the auxiliary generator 330 is computed by the frequency computation module 62 of synchronization module 54. The frequency computation module 62 receives T-aux as input and computes the frequency of the auxiliary generator 330, Freq-aux, as output.

Knowing the frequency of the auxiliary generator 330, Freq-aux (filtered), as computed below in Eq. [2] and knowing the phase angle difference, Phase-Angle-Diff$_{A\text{-}aux}$ (filtered), between phase-A of the reference 320 and phase-A, of the auxiliary generator 330, as computed in Eq. [3] below, an operator may synchronize or to control the interconnection of the auxiliary AC generator 330 with an electrical system 320, i.e., utility grid.

Process Flow

Figure 4A:
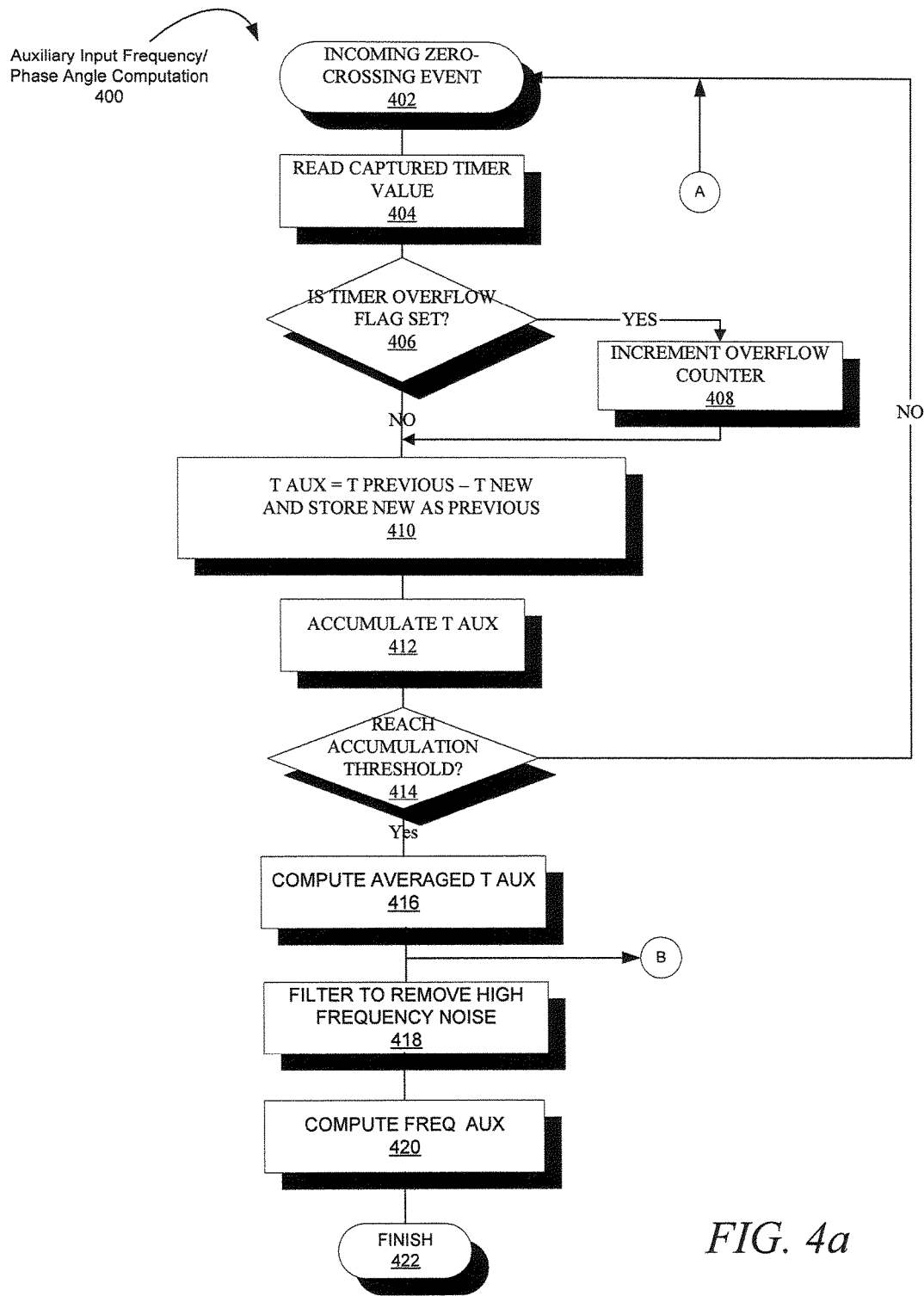
FIGS. 4a & 4b illustrate a process for controlling the interconnection of an auxiliary generator to the electrical system, in accordance with an embodiment of the present disclosure.
Figure 4B:
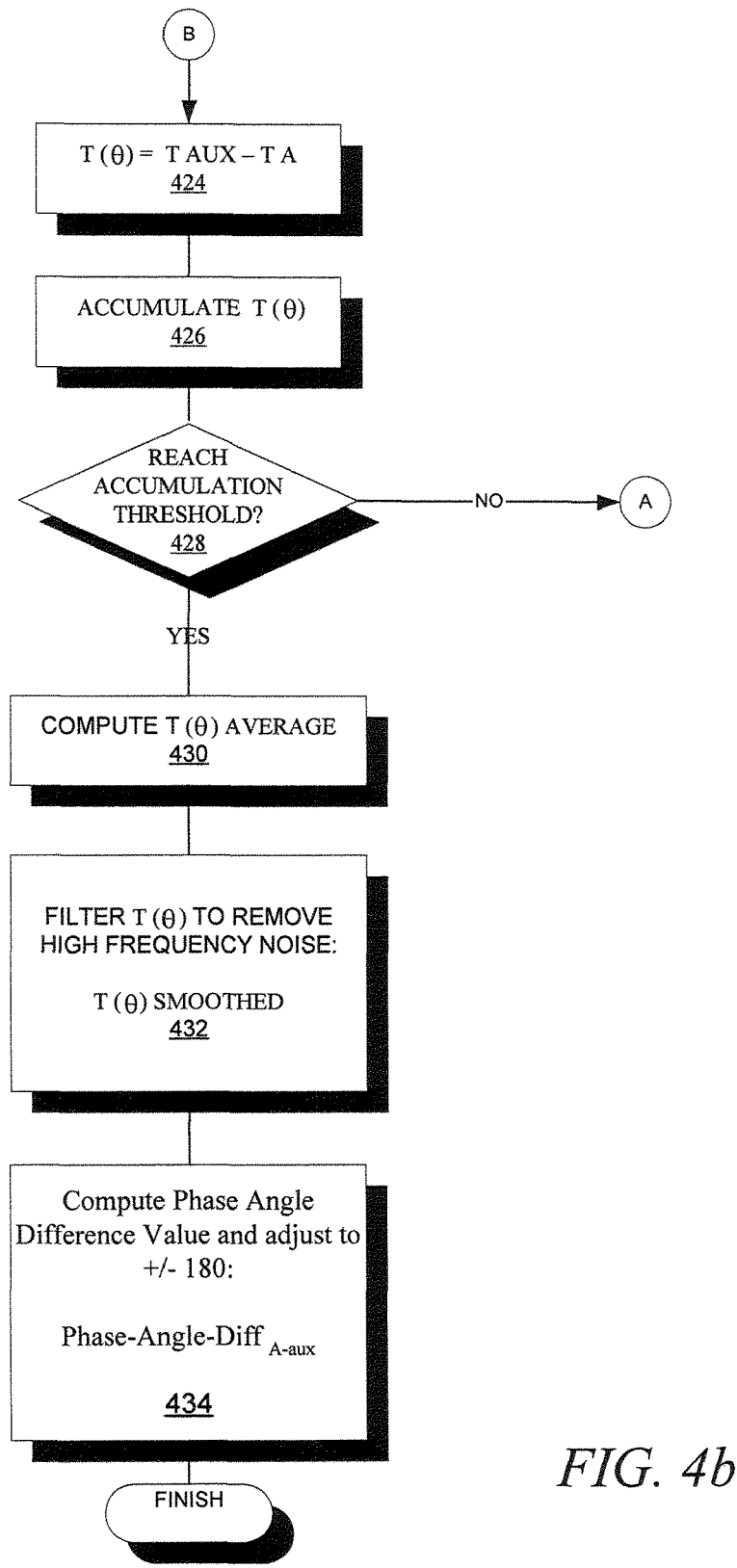

With reference now to FIG. 4, there is shown a process 400 for controlling the interconnection of an auxiliary generator 330 to the electrical system 320, in accordance with an embodiment of the present disclosure. In operation, the metering module 52 detects the rising edge zero-crossing of the reference line voltage V1 in the current cycle (Step-402). The timer value associated with the rising edge zero-crossing event in the current cycle is captured and stored in a memory of the metering module 52 as variable T-NEW (Step-404). A determination is then made regarding whether the timer overflow flag is set (Step-406). The timer overflow flag is set when the timer counting capacity is reached before the next rising edge zero-crossing interrupt occurs. In the case where the timer overflow flag is set, the overflow counter is increased by one (Step-408). The timer counting capacity is 65536 (or 0x0FFFF in Hex). If an overflow (overrun) occurs, a RAM counter is increased by one. In later computation, (current timer reading+65536*value of RAM counter) is used as total timer reading. Next, a zero-crossing difference value, T-AUX, is computed between the zero-crossing event in the present cycle, T-NEW, and the timer value associated with the zero-crossing event in the previous cycle T-PREVIOUS (Step-410).

$$T\text{-AUX}=T\text{-PREVIOUS}-T\text{-NEW} \qquad \text{Eq. [1]}$$

The zero-crossing difference value, T-AUX, is accumulated over consecutive cycles for purposes of smoothing or averaging (Step-412). Next, a determination is made regarding whether an accumulation threshold for T-AUX has been met. The accumulation threshold may be set to a value, for example, of 500 ms. If the accumulation threshold is not reached, the process returns to step 402 (as described above) to detect the rising edge zero-crossing of the reference line voltage V1 in the next waveform cycle (Step-414). Otherwise, the process computes an averaged or smoothed value for T-AUX, yielding T-AUX-AVERAGED (Step-416). The value T-AUX-AVERAGED is filtered to remove any unwanted high-frequency noise, yielding T-AUX-SMOOTHED (Step-418). Then, the frequency of the auxiliary generator 330 is computed by the frequency computation module 62 of the synchronization module 54 as follows (Step-420):

$$\text{Frequency(aux)} = 1/[T\text{-AUX-SMOOTHED}] \quad \text{Eq.[2]}$$

Where $$T\text{-AUX-SMOOTHED} = 1/[T\text{-AUX-SMOOTHED(Previous Cycle)} - T\text{-AUX-SMOOTHED (Current Cycle)}]$$

In addition to computing the frequency of the auxiliary generator 330, in accordance with the principles of the invention, it is also necessary to compute the phase angle difference, Phase-Angle-Diff$_{A\text{-}aux}$, between phase-A of the reference 320 and phase-A, of the auxiliary generator 330. This computation is shown in part 2 of the flowchart of FIG. 4, described as follows. It is first necessary to compute the zero-crossing time difference T (θ) between the positive zero-crossing time of the reference 320, T-aux SMOOTHED, and T-A, the zero crossing time of phase-A of the reference 320 for one waveform cycle (Step-424). The difference value T (θ) is accumulated over a number of waveform cycles (Step-426). A determination is made regarding whether the difference value T (θ) has reached a pre-set accumulation threshold (Step-428). If not, the process returns to step 402 to detect the next incoming zero-crossing event. Otherwise, the process computes an average T (θ) for a number of waveform cycles corresponding to the threshold (Step-430). The value T (θ) is filtered to remove any unwanted high-frequency noise, yielding T(θ) SMOOTHED (Step-432). Finally, the phase angle difference value is computed as: (Step-434)

$$\text{Phase-Angle-Diff}_{A\text{-}aux} = T(\theta)\text{SMOOTHED}/[T\text{-AUX SMOOTHED}*360] \quad \text{Eq. [3]}$$

Where T-AUX SMOOTHED is computed as:

$$T\text{-AUX SMOOTHED} = T\text{-AUX SMOOTHED(Cycle x)} - T\text{-AUX SMOOTHED(Cycle x+1)} \quad \text{Eq. [4]}$$

Synchronization

Knowing the frequency of the auxiliary generator 330, as computed in Eq. [2] and knowing the phase angle difference, Phase-Angle-Diff$_{A\text{-}aux}$, between phase-A of the reference 320 and phase-A, of the auxiliary generator 330, as computed in Eq. [3], an operator may synchronize or control the interconnection of the auxiliary AC generator 330 with an electrical system 320, i.e., utility grid. This process comprises the steps of adjusting the frequency of the auxiliary generator 330 until it is substantially equal to the frequency of the reference 320 and determining that the phase angle difference value, Phase-Angle-Diff$_{A\text{-}aux}$, is within a defined tolerance. At that point, the operator may synchronize or control the interconnection of the auxiliary AC generator 330 with the electrical system 320, i.e., utility grid. In another embodiment, it is contemplated to provide the meter module 52 with capabilities for determining when the phase angle difference value, Phase-Angle-Diff$_{A\text{-}aux}$, is within a defined tolerance. At that point, the meter module 54 manages the synchronization or control of the interconnection of the auxiliary AC generator 330 with the electrical system 320, i.e., utility grid.

In one embodiment, the apparatus 310 may further include an integrated display for displaying an instantaneous phase, frequency, phase-angle difference values and a visual indication of when the phase angle difference value, Phase-Angle-Diff$_{A\text{-}aux}$, is within a defined tolerance, to inform an operator that it is permissible to synchronize or control the interconnection of the auxiliary AC generator 330 with the electrical system 320, i.e., utility grid. In this embodiment, the apparatus 310 may be mounted in close proximity to the generator, or on a control panel of the generator, so an operator can receive confirmation that the generator is ready to be brought online.

In another embodiment, the apparatus 310 may further include a control algorithm for outputting an analog control signal to automatically control the auxiliary AC generator 330 to synchronize the auxiliary AC generator 330 with the electrical system 320, i.e., utility grid at the point in time when the phase angle difference value, Phase-Angle-Diff$_{A\text{-}aux}$, is within a defined tolerance. In this embodiment, the apparatus 310 includes a plurality of analog outputs wherein at least one analog out is coupled to the generator and provides a frequency adjust signal to adjust the frequency of the generator. When the control algorithm executing in the at least one processor described above determines the phase angle of the grid and generator are in synch, e.g., within a predetermined tolerance range, a digital output will send a control signal to the interconnecting contactors 340 to couple the generator to the grid. It is to be appreciated that the analog outputs and digital outputs may reside on an external function module coupled to the apparatus 310 over a standard communication bus, e.g., ModBus, DNP, etc. Alternatively, the analog and digital outputs may terminate on the apparatus 310 as output signal terminals which may be coupled to an external device such as a generator controller module. It is contemplated to output the analog and digital outputs from the apparatus, via a standard communication bus, as described above, to a generator controller module which is configured to output one or more control signals to the interconnecting contactors 340 to couple the generator to the grid.

Figure 5:
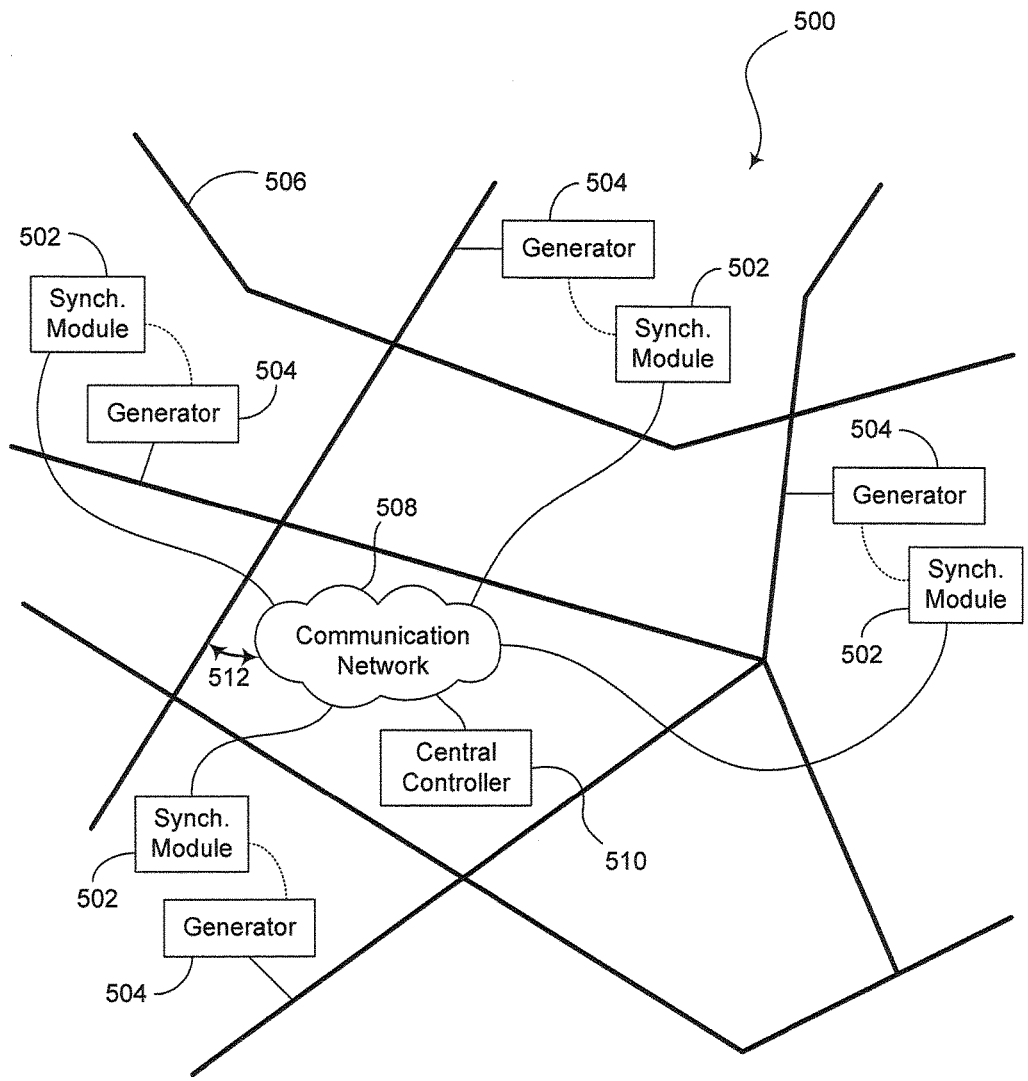
FIG. 5 is a diagram depicting a synchronization system in accordance with an embodiment of the present disclosure.

Referring to FIG. 5, a synchronization system 500 is shown in accordance with various embodiments of the present disclosure. The synchronization system 500 comprises a plurality of synchronization modules 502 corresponding to a plurality of generators 504. According to some embodiments, the synchronization modules 502 may be configured as synchrophasor modules. The synchronization modules 502, or synchrophasor modules, are configured to connect the generators 504 to a power grid 506 in synchronization with the voltage phases on the power grid 506. The power grid 506 may comprise any combination of transmission lines, relays, and other components for transmitting electrical power from power sources to consumers. According to some embodiments, the synchronization modules 502 may be configured similar to apparatus 310 described above and such synchronization modules 502 may includes the structures and/or components shown in FIGS. 3a and 3b.

The synchronization system 500 further includes a communication network 508 and a central controller 510. The communication network 508 is configured to allow communication among the synchronization modules 502 and the central controller 510. The central controller 510 is configured to distribute control signals to each synchronization module 502 to provide times when the synchronization modules 502 may connect their respective generators 504 online with the power grid 506. The central controller 510 communicates timing signals to the synchronization modules 502 to ensure that the voltage phases of the generators 504 are substantially synchronized with the voltage phase on the power grid 506. One goal of the central controller 510 is to synchronize the generators 504 with the power grid 506 within a predefined tolerance to reduce noise and other inefficiencies.

The synchronization modules 502 may be configured to analyze and record the frequency and phase angle at the point where the respective generator 504 will be connected to the power grid 506. In addition, the synchronization modules 502 may also record an exact timestamp representing the exact time the frequency and phase angle were recorded. The timestamp, for example, may be obtained from GPS signals, which may be accurate within about 10 ns, via an IRIG-B signal generating device coupled to the synchronization module 502. This information can be communicated to the central controller 510 to ensure that the generators 504 are synchronized with the voltage signals at each connection point along the power grid 506. In some embodiments, the central controller 510 may coordinate each generator 504 to be synchronized with each other at the various points along the power grid 506.

In some embodiments, the communication network 508 may be connected directly to the power grid 506 via a transmission line 512. In this respect, communication signals between the central controller 510 and the synchronization modules 502 may be transmitted along the transmission lines of the power grid 506. The communication network 508, according to various embodiments, may communicate synchronization signals over the power grid 506, Ethernet lines, telephone lines, satellite transmission, cellular transmission, Wifi transmission, WIMAX transmission, and/or other communication channels. It is to be appreciated that the synchronization modules 502 will include a communication device appropriate or compatible with a particular communication network 508, a communication device that communicates via multiple modes, e.g., hardwired and wireless or a communication device that is adaptable or reprogrammable to various known or to be developed communication networks. In various embodiments, the communication device of the synchronization modules 502 may be configured similar to communication device 28 described above.

The central controller 510 is further configured to determine the network propagation delays based on the propagation of signals between the central controller 510 and the synchronization modules 502 and associated generators 504. The propagation delay may be a factor of distance between the central controller 510 and generators 504, the path and distance of propagation signals communicated between the central controller 510 and generators, the medium over which the propagation signals are communicated, and/or other factors that affect may add to the propagation delay between two devices.

Figure 6:
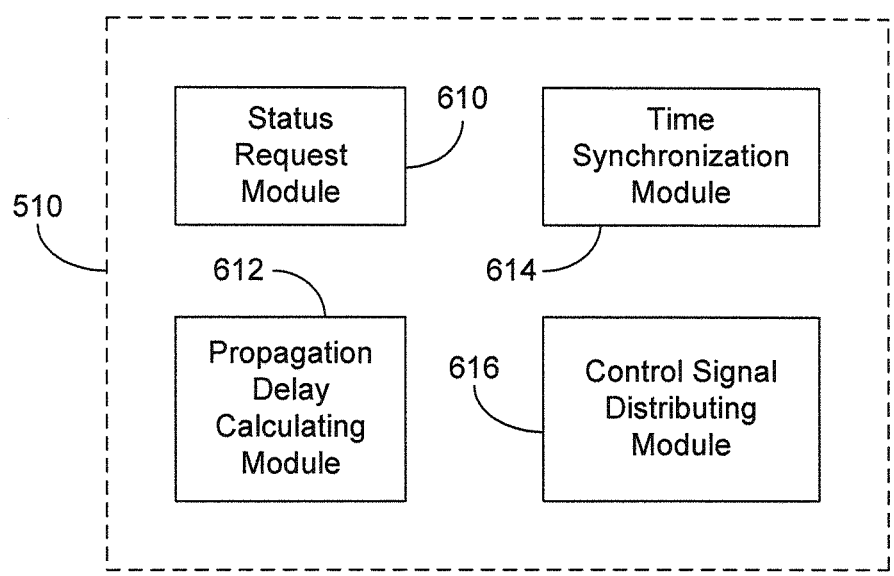
FIG. 6 is a block diagram depicting the central controller shown in FIG. 5, in accordance with an embodiment of the present disclosure.

In FIG. 6, a block diagram of the central controller 510 shown in FIG. 5 is shown in accordance with one embodiment. As illustrated, the central controller 510 includes a status request module 610, a propagation delay calculating module 612, a time synchronization module 614, and a control signal distribution module 616. In operation, the components of the central controller 510 are configured to synchronize the phase of the voltage signals of the generators 504 with the existing voltage on the power grid 506.

The status request module 610 is configured to send a signal to each of the synchronization modules 502 requesting information about a current state of the waveform of the generator 504 corresponding to the respective synchronization module 502. In response, the synchronization modules 502 send a snapshot of or information regarding the respective generators' waveforms, including, for example, the frequency of the waveform and the phase angle with respect to an exact time. Along with the waveform, the synchronization module 502 also records a timestamp when the waveform was captured and an exact time when the captured waveform is being transmitted back to the central controller 510.

When the central controller 510 receives a waveform from the synchronization module 502, the network delay calculating module 612 is configured to determine an exact time when the waveform is received. This time is compared with the exact time when the waveform was transmitted by the synchronization module 502 in order to calculate the network delay inherent in the system for transmission over the distance, path, and/or channel from the synchronization modules 502 to the central controller 510. Also, the amount of time from transmission to reception may be a factor of the distance between the respective synchronization module 502 and the central controller 510 and may also be a factor of the medium along which the signals are transmitted. In order to maintain consistent time measurements throughout the synchronization system 500, the components of the synchronization system 500 may utilize GPS time signals for clock synchronization within a tolerance of about 10 ns. The components may alternatively use other clock or time synchronization methods, such as Precise Time Protocol.

Once the time delay is calculated for each synchronization module 502 and the beginnings of the periods of the waveforms (or other phase angle measurements) are known, the time synchronization module 614 is configured to determine the times when the different generators 504 may be connected. The control signal distribution module 616 is configured to transmit control signals to each of the synchronization modules 502 to control when each generator 504 is to be connected on the power grid 506. The control signal distribution module 616 takes the network delay into account when sending the control signals to the different synchronization modules 502.

It is to be understood that the central controller 510 may be implemented in various forms of hardware, software, firmware, special purpose processors, or a combination thereof. In one embodiment, the techniques of the present disclosure may be implemented in software as an application program tangibly embodied on a program storage device. The application program may be uploaded to, and executed by, the central controller 510 comprising any suitable architecture such as a personal computer, a workstation, server, etc. In one embodiment, the central controller 510 is implemented on a computer platform having hardware such as one or more central processing units (CPU), a random access memory (RAM), a read only memory (ROM) and input/output (I/O) interface(s) such as a keyboard, cursor control device (e.g., a mouse or joystick) and display device. A system bus couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform of the central controller 510 by various interfaces and bus structures, such a parallel port, serial port or universal serial bus (USB). One such peripheral device may include a communications device, e.g., a modem, satellite relay, wireless connection, etc., for enabling communications from the central controller 510 to various synchronization modules 502. Other peripheral devices may include additional storage devices, a printer and a scanner.

It is to be further appreciated that the central controller 510 may be incorporated into one of the synchronization modules 502. In this embodiment, the central controller 510 may be embodied on a printed circuit board, e.g., as a plug-n-play card, which is disposed within a housing of the synchronization module 502.

The present disclosure provides a system and method for measuring and analyzing synchronized real-time data of multiple remote measurement points on an electrical power distribution grid. Although various embodiments were described above in relation to adding multiple generators to a grid, the techniques of the present disclosure may be employed to measure or assess the state of the grid and manage power quality. For example, the techniques of the present disclosure may be used for power system automation; load shedding and other load control methodologies; disturbance recording and analysis; prevention of power outages; fault detection; wide area control of local distribution grids, regional transmission networks and the like.

While the disclosure has been shown and described with reference to certain preferred embodiments thereof, it will be understood by those skilled in the art that various changes in form and detail may be made therein without departing from the spirit and scope of the disclosure.

Furthermore, although the foregoing text sets forth a detailed description of numerous embodiments, it should be understood that the legal scope of the invention is defined by the words of the claims set forth at the end of this disclosure. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than in the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A system comprising:
    a plurality of power generators configured to be connected to transmission lines of an existing power grid;
    a plurality of synchronization modules, each synchronization module corresponding to one of the plurality of power generators and outputs a control signal to adjust at least one of a frequency and phase angle of a voltage waveform of a respective power generator; and
    a controller in communication with the plurality of synchronization modules, the controller including a status request module configured to transmit a request to each of the plurality of synchronization modules to obtain status of each of the plurality of synchronization modules, the status of each of the plurality of synchronization modules including a frequency of a voltage waveform and phase angle difference between the voltage waveform of the respective power generator and a voltage waveform of the existing power grid;
    wherein the controller time synchronizes a phase of the voltage waveform of the respective power generator to a phase of the voltage waveform of the existing power grid based on a received voltage waveform from a synchronization module of a respective power generator and determination of a calculated delay of the received voltage waveform from the synchronization module with a transmission of a timing signal to the synchronization module.

2. The system of claim 1, further comprising a communication network, wherein the controller communicates with the plurality of synchronization modules via the communication network.

3. The system of claim 2, wherein the communication network is configured to communicate with the plurality of synchronization modules via the existing power grid.

4. The system of claim 1, wherein each synchronization module is associated with a meter module configured to sense electrical parameters of an electrical power distribution system associated with the existing power grid.

5. The system of claim 4, wherein each synchronization module is further configured to compute a frequency of a voltage waveform of the respective power generator using zero-crossing times of the voltage waveform.

6. The system of claim 1, wherein the controller is incorporated in one of the synchronization modules.

7. The system of claim 1, wherein the controller time synchronizes the plurality of synchronization modules using Precise Time Protocol.

8. The system of claim 1, wherein the controller further includes a control signal distribution module configured to send a control signal to each synchronization module to control when each synchronization module connects the respective power generator to the existing power grid.

9. The system of claim 1, wherein the voltage waveform of a respective power generator is received from at least one of the plurality of synchronization modules with a timestamp.

10. The system of claim 9, wherein the timestamp is determined from a GPS signal.

11. The system of claim 9, wherein the timestamp is determined from an IRIG-B signal generating device coupled to each synchronization module.

12. The system of claim 2, wherein the communication network is configured to communicate with the plurality of synchronization modules via at least one of Ethernet lines, telephone lines, satellite transmission, cellular transmission and WiFi transmission.

13. The system of claim 1, wherein a time clock of the controller and a time clock of each of the plurality of synchronization modules are synchronized using Precise Time Protocol.

14. The system of claim 4, wherein the meter module is configured to be coupled to the existing grid and the synchronization module is configured to be coupled to the generator.

15. The system of claim 14, wherein the meter module is configured to determine power usage at the point of coupling to the existing power grid.

16. The system of claim 15, wherein the meter module and synchronization module are incorporated into a single device.

17. The system of claim 1, wherein at least one of a digital electrical power and energy meter, a Programmable Logic Controller (PLC), a Remote Terminal Unit, a protective relay and/or a fault recorder is incorporated into at least one of the plurality of synchronization modules.

18. The system of claim 16, wherein the single device further includes a display configured to display at least one of an instantaneous phase, a frequency and/or phase angle difference values.

19. The system of claim 1, wherein the controller is configured as a plug-n-play card disposed in a housing of one of the plurality of synchronization modules.

20. A controller in communication with a plurality of synchronization modules, each synchronization module corresponding to one of a plurality of power generators connected to transmission lines of an existing power grid, the controller comprising:
   a status request module configured to transmit a request to each of the plurality of synchronization modules to obtain status of each of the plurality of synchronization modules, the status of each of the plurality of synchronization modules including a frequency of a voltage waveform and phase angle difference between the voltage waveform of a respective power generator and a voltage waveform of the existing power grid;
   wherein the controller time synchronizes a phase of the voltage waveform of the respective power generator to a phase of the voltage waveform of the existing power grid based on a received voltage waveform from a synchronization module of a respective power generator and determination of a calculated delay of the received voltage waveform from the synchronization module with a transmission of a timing signal to the synchronization module.

21. The controller of claim 20, wherein the controller time synchronizes the plurality of synchronization modules using Precise Time Protocol.

22. The controller of claim 20, further comprising a control signal distribution module configured to send a control signal to each synchronization module to control when each synchronization module connects the respective power generator to the existing power grid.

23. The controller of claim 20, wherein the voltage waveform of a respective power generator is received from at least one of the plurality of synchronization modules with a timestamp.

24. The controller of claim 23, wherein the timestamp is determined from a GPS signal.

25. The controller of claim 23, wherein the timestamp is determined from an IRIG-B signal generating device coupled to each synchronization module.

26. The controller of claim 20, wherein the controller communicates with the plurality of synchronization modules via at least one of Ethernet lines, telephone lines, satellite transmission, cellular transmission and/or WiFi transmission.

27. The controller of claim 20, wherein a time clock of the controller and a time clock of each of the plurality of synchronization modules are synchronized using Precise Time Protocol.

28. The controller of claim 20, wherein the controller communicates with the plurality of synchronization modules via the transmission lines of the existing power grid.

* * * * *